United States Patent [19]
Ishimori et al.

[11] Patent Number: 5,897,778
[45] Date of Patent: Apr. 27, 1999

[54] METHOD FOR ELIMINATING ENVIRONMENTAL POLLUTANTS

[75] Inventors: Yoshio Ishimori, Kawasaki; Naoyuki Hirate, Yokosuka; Masashi Awa, Kawasaki, all of Japan

[73] Assignee: Kabushiki Kaisha Toshiba, Japan

[21] Appl. No.: 08/753,724

[22] Filed: Nov. 29, 1996

[30] Foreign Application Priority Data

Dec. 1, 1995 [JP] Japan .................................. 7-314314

[51] Int. Cl.$^6$ ...................................................... C02F 1/28
[52] U.S. Cl. ...................... 210/631; 210/679; 210/691; 210/747
[58] Field of Search ...................... 134/7, 25.1; 210/688, 210/691, 692, 693, 694, 747, 170, 631, 679

[56] References Cited

U.S. PATENT DOCUMENTS

| | | | |
|---|---|---|---|
| 4,839,051 | 6/1989 | Higa | 210/747 |
| 4,882,071 | 11/1989 | Bench et al. | 210/170 |
| 5,043,076 | 8/1991 | Alexander | 210/747 |
| 5,057,227 | 10/1991 | Cohen | 210/691 |
| 5,116,515 | 5/1992 | Selesnick | 210/747 |
| 5,264,134 | 11/1993 | McCamy | 210/747 |

FOREIGN PATENT DOCUMENTS 7-96289  4/1995  Japan .

*Primary Examiner*—Ivars Cintins
*Attorney, Agent, or Firm*—Finnegan, Henderson, Farabow, Garrett & Dunner, L.L.P.

[57] ABSTRACT

A porous absorbent made of a filter, a filter material or a sponge material is inserted into a polluted part of soil or groundwater containing environmental pollutants such as chlorinated solvents or heavy metal ions. The porous absorbent is inserted into the polluted environment such that its one end comes into contact with the pollutants and the other end is exposed to air. The porous absorbent allows the pollutants absorbed thereby to rise up to its air-exposed end through the vaporizing activity of the pollutant themselves and of the water containing them. The pollutants are allowed to evaporate from the air-exposed end to be dissipated into the air, or to concentrate at the air-exposed end for later removal. Further, microorganisms fixed to the porous absorbent are used to decompose pollutants for removal, or to absorb pollutants for removal. Those pollutant eliminating methods allow efficient elimination of even highly concentrated pollutants at a low cost without requiring complicated processes. The method based on the use of microorganisms is further advantageous in that it is less stressful to the environment and biologically safer.

14 Claims, 7 Drawing Sheets

METHOD FOR ELIMINATING ENVIRONMENTAL POLLUTANTS

BACKGROUND OF THE INVENTION

1. Field of the Invention

The present invention relates to a method whereby environmental pollutants can be eliminated from the polluted environment (polluted sites) such as, for example, soil or groundwater which have been contaminated with environmental pollutants.

2. Description of the Related Art

Recently, leaks into the environment of chlorinated organic solvents such as trichloroethylene and dichloroethylene that have been used as detergents in many factories are arising a great concern among public. In the United States, environmental pollution such as the contamination of soil and groundwater with chlorinated organic solvents, initiated by the contamination with petroleum and gasoline, have progressed to a gravely risky degree. To meet such situations, general tendencies proceed towards imposing sterner regulations onto the use of such chlorinated organic solvents as mentioned above. However, a problem still remains how to treat the environment that has been contaminated with those chlorinated organic solvents, that is, how to treat the soil and groundwater contaminated with such pollutants.

To cope with such problems, methods for treating soil and groundwater contaminated with chlorinated organic solvents have been investigated. The treating methods hitherto proposed consist of physical processing such as air extraction under vacuum or combustion, but there is still a strong demand for methods whereby the environment, without suffering undue stresses, can be cleaned up such pollutants at a low cost. To meet such demand, the technologies enabling the decomposition/elimination of environmental pollutants by the use of microorganisms or so-called "bio-remediation" of the polluted environment have been proposed and are attracting people's attention.

Bio-remediation of the polluted environment can be achieved by roughly three different procedures: 1) a bio-reactor type of treatment which consists of fixing bacteria that decompose pollutants and of applying them as a solid (a closed-system treatment), 2) a treatment which consists of activating the bacteria endogenous to the polluted soil or groundwater by providing them with various nutrients (endogenous bacteria activation) and 3) a treatment which consists of delivering directly to the polluted sites bacteria (they may be delivered in the form of solids) capable of decomposing pollutants (an open-system treatment). The characteristics of the three methods are summarized in the table below.

TABLE 1

|  | Closed-system treatment | Endogenous bacterial activation | Open-system treatment |
| --- | --- | --- | --- |
| Installation cost | Big | Intermediate | Small |
| Running cost | Big | Intermediate | Small |
| Treatment time | Small | Intermediate | Big |
| Treatable amount | Intermediate | Big | Intermediate |
| Reaction controllability | Easy | Difficult | Almost impossible |
| Bio-safety | Big | Small | Small |

TABLE 1-continued

|  | Closed-system treatment | Endogenous bacterial activation | Open-system treatment |
| --- | --- | --- | --- |
| Concentration of pollutants to be treated | Big | Intermediate | Small |

The conventional methods such as described above which concern with the decomposition/elimination of environmental pollutants by the use of microorganisms have their characteristic disadvantages as well as advantages as shown in Table 1. Take the close-system treatment as an example, it is excellent in treating capacity and in easy controllability and enjoys high safety while it is disadvantageous in that its installation and operation require a high cost. The endogenous bacteria activation, on the other hand, is excellent in treating capacity, but is disadvantageous in reaction controllability, cost-effective installation and operation, and bio-safety. The open-system treatment, though being meritous in enabling low-cost installation and operation, and in achieving biosafety, is still deficient in treatment time and in treatable pollutant concentrations. Furthermore, with all these methods reactions are practically uncontrollable, and inevitable addition of microorganisms to existent bacteria may become a threat to the bio-safety of the environment.

Because, as are discussed above, conventional methods for decomposing/eliminating environmental pollutants by the use of microorganisms have their own characteristic advantages and disadvantages at the same time, it is customary currently to choose one from among them and to apply it in combination with other chemical or physical methods, according to the nature of the pollutants of the environment to be treated.

The bio-remediation has its characteristic merits: it requires only a low cost for operation, it doesn't require much man-power for operation/maintenance, and it doesn't impose much stresses on the environment. The open-system treatment appears to be most amply provided with such merits characteristic to bio-remediation, but there are still strong demands that the above-described defects characteristic to the open-system treatment should be corrected further.

SUMMARY OF THE INVENTION

In view of above, the object of this invention is to provide a method for eliminating environmental pollutants which is characterized in that it treats the pollutants at a low cost, doesn't require much man-power for operation, and allows treatment of high concentrations of pollutants, and further in that it imposes only low stresses on the environment, requires only a short time for treatment, and is excellent in reaction controllability and bio-safety.

The method of this invention for eliminating environmental pollutants is a method whereby an environment pollutants can be eliminated from polluted site with those pollutants, and is characterized by inserting a porous absorbent into said polluted site so that the one end of said porous absorbent contacts with said pollutants, and the other end of said porous absorbent exposes in air, and eliminating said pollutants absorbed into said porous absorbent by being risen up said absorbed pollutants to said air-exposed end side of said porous absorbent.

For pollutants to be eliminated by the method of this invention, microorganisms capable of decomposing/ absorbing such pollutants may be fixed to at least parts of the porous absorbent.

When the porous absorbent is inserted into the soil or groundwater which has been contaminated with pollutants (polluted sites), the environmental pollutants are absorbed into the porous absorbent, and rise through the porous absorbent spontaneously owing to their own vaporizing activity or the vaporizing activity of the water (groundwater) containing pollutants. When the pollutants are volatile, they vaporize at the air-exposed end of the porous absorbent, to be released gradually into the air. This process allows a polluted site to be cleaned up pollutants. When the pollutants are non-volatile, hydrophilic substances like heavy metal ions, they are concentrated at the air-exposed end side of the porous absorbent because, for example, a groundwater containing them vaporizes there, and leaves them to concentrate there. Accordingly, the polluted site can be cleaned up the pollutants.

As shown in above, once the porous absorbent has been buried under a polluted site, it allows efficient removal of the pollutants there without requiring any maintenance works and energy supply. It also allows involved reactions to be controlled readily. Even when the member is used with microorganisms fixed thereto, by limiting the fixation of the microorganisms to a part of the member, the member could be made less stressful to the environment and less threatening to the bio-safety of the environment. When this invention is applied by selecting appropriate materials for the porous absorbent, appropriate species of microorganisms, and appropriate ones with regard to other involved factors, effective elimination of even highly concentrated pollutants will be possible.

DESCRIPTION OF THE PREFERRED EMBODIMENTS

Examples embodying the present invention will be described below.

Figure 1:
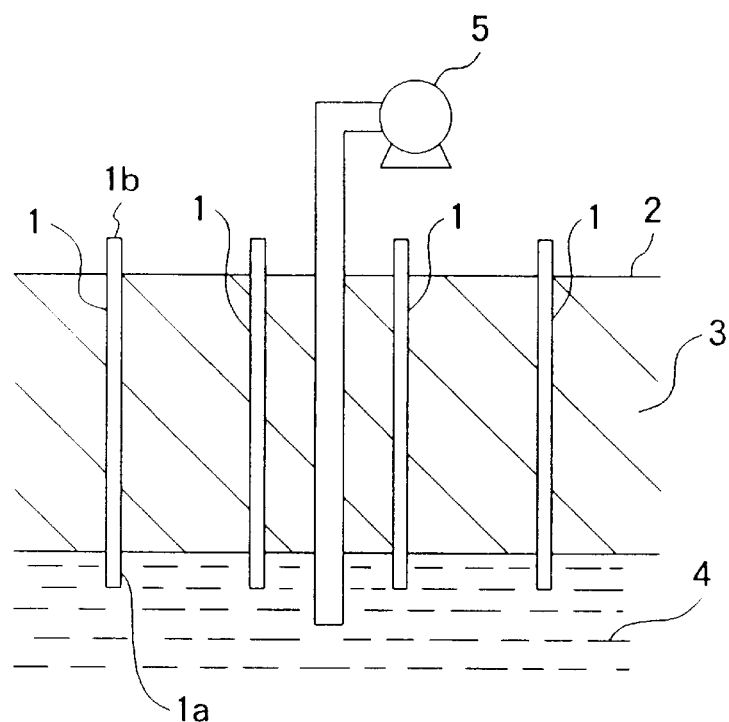
FIG. 1 gives a schematic diagram illustrating how the method of the present invention is put into practice for eliminating environmental pollutants.

FIG. 1 gives a schematic diagram illustrating how the method of the present invention is put into practice for eliminating environmental pollutants. In this example, a polluted groundwater was chosen as an object from which environmental pollutants should be eliminated with the system of this invention. The figure illustrates how elimination of pollutants from the groundwater is in progress. Incidentally, the system of this invention can be applied not only for cleaning up polluted groundwater but also for effective removal of pollutants from the soil containing pollutants or other polluted sites.

The environmental pollutants to be effectively eliminated (treated) by the method of this invention include, for example, volatile hydrophobic pollutants. When the volatile hydrophobic pollutants come into contact with the porous absorbent 1 which works for removal of pollutants, their adsorption onto, dispersion in, penetration into and vaporization from the porous absorbent take place as a natural process because of their volatile property, which enables the spontaneous removal of those pollutants. Such volatile hydrophobic pollutants may include, for example, chlorinated organic solvents such as trichloroethylene, dichloroethylene, and the like, petroleum, gasoline, long-persistent agrochemicals, PCts, etc. The method of this invention is well adapted for the treatment of above chemicals, but is not limited to them.

The method of this invention is also effective for the elimination of non-volatile, hydrophilic (water-soluble) pollutants like heavy metal ions. The environmental pollutants such as heavy metal ions are absorbed by the porous absorbent 1 together with polluted water containing them, to be eliminated from the polluted sites. The heavy metals to be eliminated by this method may include, for example, cadmium, lead, chromium etc.

Steps necessary for the elimination of environmental pollutants will be explained below. In FIG. 1, 2 represents the ground surface and 3 soil. FIG. 1 illustrates how polluted groundwater 4 is located below the soil 3. Into such a polluted site, porous absorbents 1 are buried for the elimination of pollutants therefrom. The porous absorbent 1 is inserted through the soil 3 into the groundwater 4 such that its one end 1a is kept in the polluted groundwater 4, thereby contacting with pollutants therein. The other end 1b of the porous absorbent 1 is kept at a position above the ground surface 2, to be exposed to air. In the figure, 5 represents a well prepared for analysis of the groundwater.

For the system of this invention to be applied to a polluted soil, the porous absorbent 1 is inserted into the soil such that its one end 1a is kept in the polluted part of the soil. In short, the porous absorbent 1 should be inserted under ground so that its one end 1a may come into contact with the polluting substances of the contaminated underground structure. The other end 1b of the porous absorbent should be exposed to air as described above.

Appropriate materials of the porous absorbent 1 may include absorbing multi-cellular structures, such as filter parers, filtering materials, sponge materials, etc. In other words, the appropriate materials to be used for the porous absorbent 1 may include any multi-cellular structures that allow absorbed pollutants or the water containing them to rise through their structures under the influence of the vaporizing activity of the pollutants or of the water.

Appropriate elementary materials for the porous absorbent 1 may include, besides conventional papers, various fibers and plastics, etc. Put it more concretely, they may include various natural fibers, non-woven textiles made of plastic fibers, woven-textiles, plastic foams, etc. Care should be taken, however, to choose one that is insoluble to the pollutants to be eliminated. Further, when the porous absorbent 1 is used that is made of a bio-degradable material, it will be decomposed by natural actions within a certain period after it has been buried under ground. This spares the works necessary for disposal of the porous absorbent 1 after the environment has been cleaned up pollutants.

When the pollutants to be eliminated are hydrophobic substances, it is preferable to use, as the porous absorbent 1, a multi-cellular structure that has been made hydrophobic after being treated with TEFLON™, a fluorocarbon resin, or a multi-cellular structure containing a hydrophobic material such as TEFLON™. By adjusting the hydrophobic property of the porous absorbent 1 one can achieve an optimum condition under which pollutants can be most effectively driven out through the vaporizing activity of the groundwater containing the pollutants. To eliminate hydrophilic pollutants, generally hydrophilic multi-cellular structures should be used.

The particularly preferred hydrophobic material to be used for the construction of the porous absorbent 1 is polyurethane. This is because polyurethane readily allows one to adjust its hydrophobic property during synthesis of its prepolymer compound, and to make it into a sponge structure (foams, etc.). Further, polyurethane is most adequate as a substrate to fix microorganisms thereupon as described later.

Figure 2:
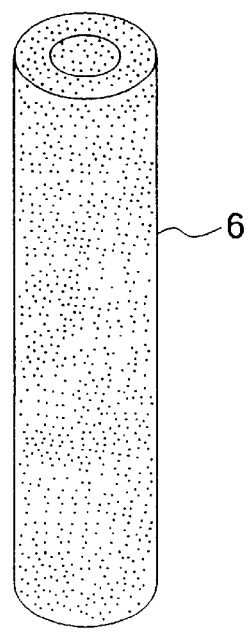
FIG. 2 gives a perspective view of a form of the porous absorbent.

The porous absorbent 1 can take any form as long as its one end reaches the polluted part in groundwater 4 and the other end protrudes for a certain distance above the ground surface 2. The porous absorbent 1 can take, for example, a long rectangular form like a strip. Further, as shown in FIG. 2, the porous absorbent 6 may take advantageously a cylindrical form such as cylinder, polygonal cylinder, etc. The space at the center of such structure facilitates the vaporization of pollutants or of water containing the pollutants, thereby enhancing efficient elimination of those pollutants.

Figure 3:
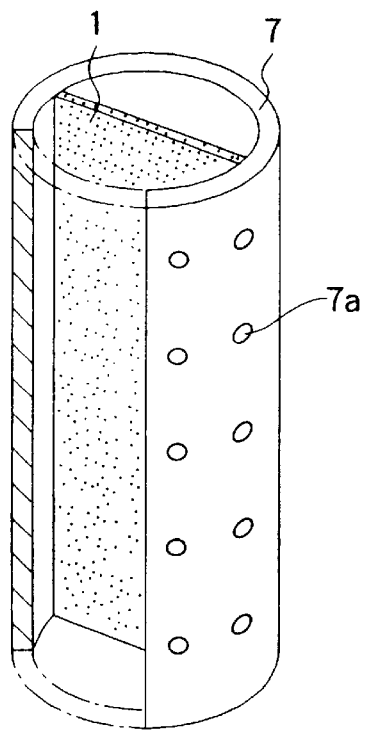
FIG. 3 illustrates how a space forming cylinder is arranged around the porous absorbent; its part is broken off for the purpose of illustration.

Furthermore, as shown in FIG. 3, it will be an effective revision of this invention to add a space forming cylinder 7 around the porous absorbent 1, to form a sufficiently wide space around the porous absorbent 1. This arrangement allows air to pass easily round the member, thereby to facilitate the vaporization of pollutants or of water containing the pollutants therefrom. The space forming cylinder 7 should preferably have holes 7a on its wall so that the entry and adsorption of pollutants to the porous absorbent 1 may not be hampered. Addition of the space forming cylinder 7 is also effective when microorganisms are used in combination as described later.

The number of the porous absorbents 1 to be inserted under ground and the area of the air-exposed end 1b are not limited to any specific values. They can vary according to the nature of pollutants to be eliminated, polluted states of the soil and groundwater, polluted areas, the property of the porous absorbent 1 and its size, and further to whether microorganisms as described later are fixed or not, and to the property of those microorganisms. In short, the various parameters should be determined so that continuous elimination of pollutants may become possible. Besides above parameters, various factors such as the state of the soil polluted, its depth, season at which elimination takes place, etc. are involved in an entangled manner for realization of the continuous elimination of pollutants. Various involved parameters, therefore, should be determined according to the conditions of a given environment to be treated.

Figure 4:
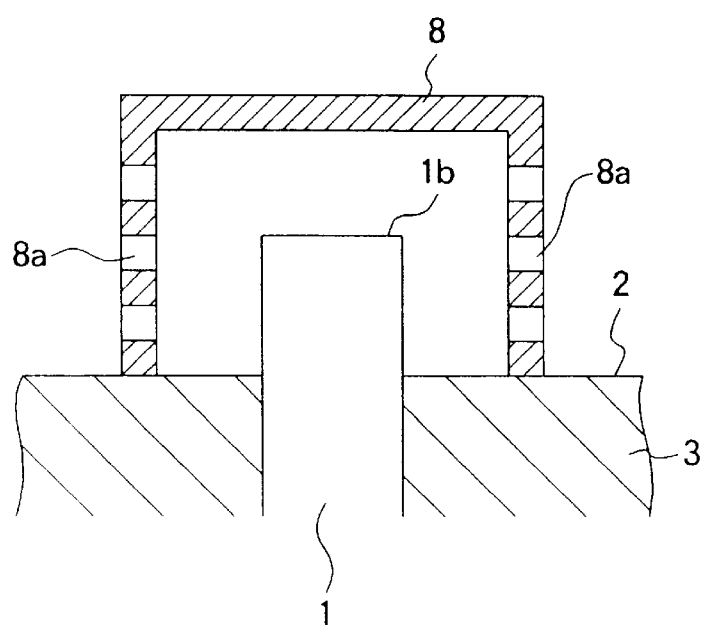
FIG. 4 gives a sectional, simplified diagram of a modified form of the example shown in FIG. 1.

The end 1b protruding above ground of the porous absorbent 1 may be exposed naked to air as is shown in FIG. 1. Alternatively, as shown in FIG. 4, the end 1b protruding above ground of the porous absorbent 1 may be covered with a protective cylinder 8. The protective cylinder 8 is to protect the air-exposed end 1b from suffering lowered eliminating activity under the influence of winds and rains (particularly rains). The protective cylinder 8 has airing holes 8a opened through its side walls, so as not to hinder the vaporization of pollutants during operation. Further, when particularly harmful pollutants should be eliminated, the protective cylinder 8 can be connected to an exhaust gas treating apparatus or the like. This maneuver could prevent such harmful pollutants from freely dissipating into the air.

When pollutants are volatile hydrophobic substances like chlorinated organic solvents, they are adsorbed firstly to the porous absorbent 1, being removed from a polluted groundwater. The pollutants adsorbed to the porous absorbent 1 rise spontaneously within the substance of the member through their own vaporizing activity or through capillary action, because of the other end 1b of the member being exposed to the air. Thus, the pollutants vaporize one portion after another, for example, into the air from the air-exposed end 1b of the porous absorbent. In this manner, environmental pollutants can be eliminated from the polluted groundwater 4. This applies also for the polluted soil.

When pollutants are non-volatile hydrophilic substances like heavy metal ions, a groundwater containing the pollutants (polluted water) is absorbed by a porous absorbent 1. The water absorbed by the porous absorbent 1 rises spontaneously by way of its own vaporizing activity, and vaporizes one portion after another into the air from the other end 1b. With the ascent and vaporization of groundwater, heavy metal ions and others rise also through the substance of the porous absorbent 1, and are concentrated at the other end 1b side of the porous absorbent 1 which is exposed to air. After a certain interval, the porous absorbent 1 is removed, and the concentrated heavy metals deposited thereupon are disposed (or recycled). Repeating this process enables elimination of pollutants from the polluted groundwater 4. This applies also for the polluted soil.

As seen from above, once the porous absorbent 1 is embedded into the polluted sites, it eliminates in an efficient manner pollutants from polluted site such as soil or groundwater without requiring any maintenance works or energy supply. Further, preparing the porous absorbent 6 in the form of cylinder, or surrounding the member with a sheath with a sufficient space in between ease the passage of air, thereby accelerating the vaporization/elimination of pollutants.

The concentrations of pollutants treatable by the method of this invention vary according to various factors including the shape of the porous absorbent 1, whether or not later-described microorganisms are used in combination, the position of polluting sources, the geological state of the polluted sites, the season when elimination of pollutants takes place, etc. This method, however, can handle more concentrated pollutants when compared with the conventional closed-system treatment method. Briefly, the method of this invention allows more efficient treatment of concentrated pollutants at a low cost, requiring less human power for maintenance. The system also allows easier control of parameters involved in reactions.

According to the present invention, as described above, the porous absorbent 1, by being simply embedded into the polluted sites, can eliminate the pollutants therefrom. Furthermore, to enhance the pollutant eliminating activity of the porous absorbent 1, microorganisms capable of decomposing or absorbing pollutants to be eliminated may be fixed onto at least a part of the member 1. This constitution allows the majority of the pollutants, during their passage through the porous absorbent 1 up to the air-exposed end 1b, to be decomposed and detoxified under the lytic activity of the fixed bacteria. Or, pollutants are absorbed and stabilized by the fixed bacteria so that their stresses on the environment can be minimized. Furthermore, because microorganisms are fixed so firmly onto the porous absorbent 1 that their escape into the environment becomes improbable. Thus, this constitution will surely improve the bio-safety of the pollutant treatment system involved.

The utilizable microorganisms are not limited to any specific species, but may contain any species as long as they are capable of decomposing pollutants to be eliminated, or of absorbing/stabilizing those pollutants. They may include, for example, for the decomposition of chlorinated organic solvents, such bacteria as Micrococcus, Stomatococcus, Planococcus, Staphylococcus, etc.

The method by which to fix microorganisms capable of decomposing/absorbing pollutants is not limited to any specific ones, but may include any conventional ones based on containment or absorption of pollutants. For example, the method based on containment employs, as the material for fixing microorganisms, fibrous proteins such as collagen, etc., polysaccharides such as carrageenin, etc., and polymers such as polyacrylamide, polyurethane, etc. If microorganism happen to be strongly adhesive to the porous absorbent 1, it is not always necessary to take a special measure for fixing the microorganisms onto the porous absorbent 1.

When polyurethane is used as a material for fixing microorganisms thereupon, the hydrophobic activity of the end-product can be adjusted easily to any desired value, when the adjustment is made at the stage where a prepolymer compound has been formed. Use of polyurethane therefore can spare, for example, the process necessary for making the surface of the porous absorbing material 1 hydrophobic. This is desirable for the manufacture of the porous absorbing material 1. Furthermore, it is possible to process polyurethane in such a manner that it has a spongy structure. Such spongy structure alone upon which microorganisms have been fixed can absorb pollutants and help the pollutants evaporate without any special supports for that purpose. In that case, the substrate itself upon which microorganisms have been fixed can be a substitute for the porous absorbent 1.

Figure 5:
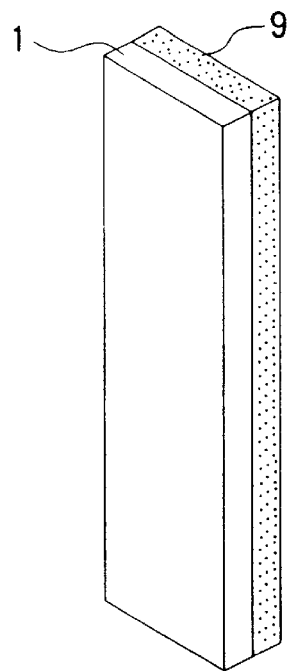
FIG. 5 gives a perspective view for illustrating how microorganisms are fixed onto a porous absorbent.
Figure 6:
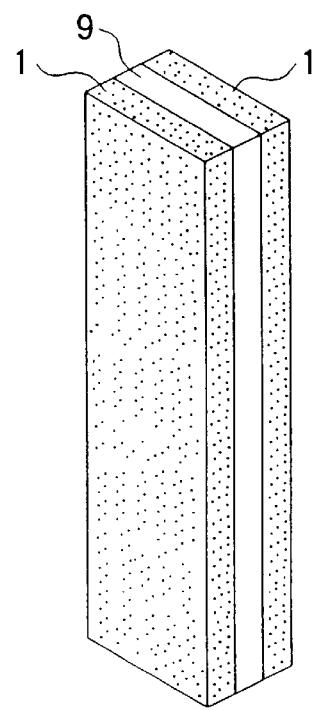
FIG. 6 gives a perspective view of another example for illustrating how microorganisms are fixed onto porous absorbents alternatively.

The method by which to bond the microorganism-fixed substrate onto the porous absorbent 1 is not limited to any specific ones. For example, as shown in FIG. 5, a strip of porous absorbent 1 is bonded to a similarly shaped microorganism-fixed substrate 9. The microorganism-fixed substrate 9 may be made smaller than the porous absorbent 1 so that, when they are put together, the former covers a portion of the latter. Furthermore, as shown in FIG. 6, a microorganism-fixed substrate 9 may be sandwiched between two porous absorbents 1. Such construction allows the vaporizing activity of pollutants or of groundwater containing them absorbed by the porous absorbent 1 to be maintained at a sufficiently high level. The two members may be bonded by any agent provided that the agent is not easily dissolved by pollutants or water, or does not affect the growth of the microorganisms. Appropriate adhesive agents may include, for example, epoxy adhesives, cyanoacrylate adhesives, etc.

When a highly bio-degradable material is used for the fixation of microorganisms, it is preferable, as shown in FIG. 3, to arrange a space forming cylinder 7 around the porous absorbent 1, so that a sufficiently wide space may be formed in between. Such construction protects the microorganisms from the lytic activity of organisms endogenous to the environment. If a sufficiently wide space were not prepared, the microorganisms would easily undergo lysis under the attacks by the organisms endogenous to the environment. When a poorly bio-degradable material like a polymer is used as the substrate upon which the microorganisms grow, it is not always necessary to prepare a space around the porous absorbent 1. However, when the porous absorbent of such construction is used, it is necessary to remove the member at certain intervals and to dispose of the used substrates in some way or other. It is recommended, however, to add a space forming cylinder 7 to the porous absorbent 1 which is helpful at least for preparing the conditions (ventilation) favorable for the growth of the microorganisms.

Now, preferred embodiments of the present invention will be described with reference to the experimental results.

EXAMPLE 1

At first description will be given of a model experiment wherein a groundwater contaminated with trichlene (trichloroethylene) was examined. Trichlene has a larger specific gravity than water, and sparelingly soluble to water (about 1,000 ppm at saturation). Thus, trichlene is said to deposit at the depth of groundwater.

Figure 7:
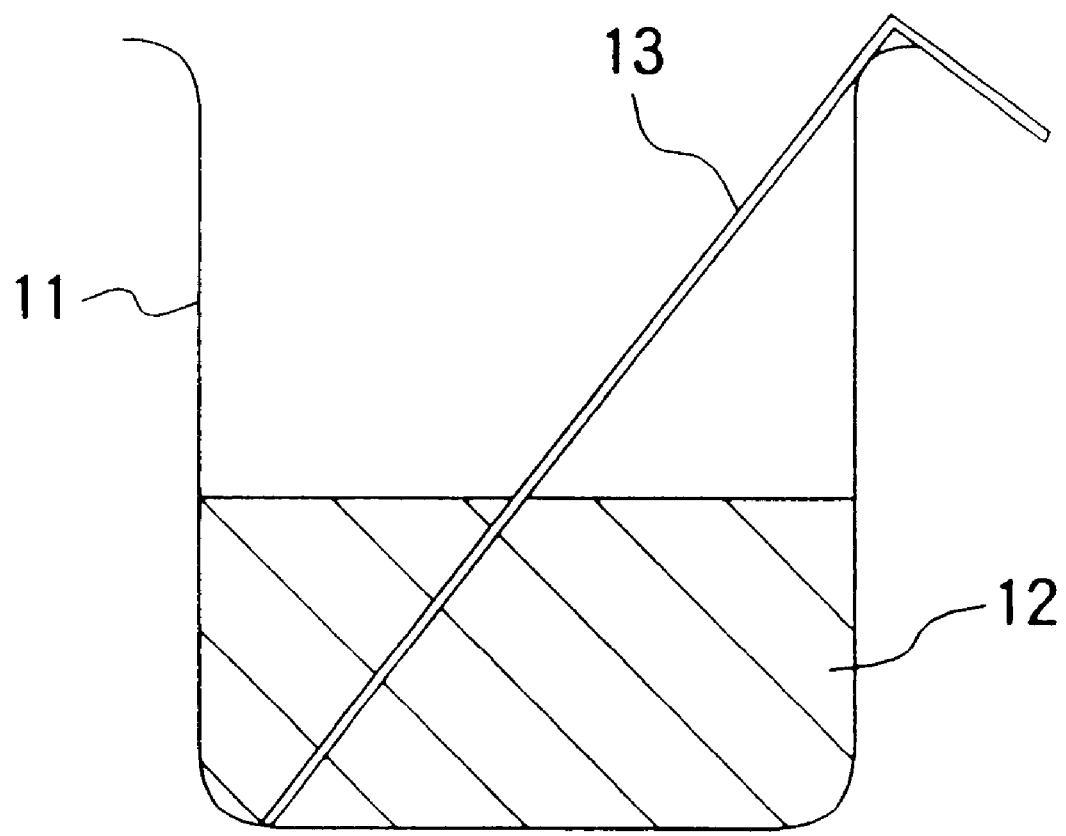
FIG. 7 gives an outline of the experiment done in Example 1.

FIG. 7 outlines the experiment exercised in Example 1. Firstly, about 50 ml of glass beads of 2 mm in diameter each were placed in a 100 ml glass beaker 11, and then trichlene aqueous solution of 1000 ppm whose volume was arbitrarily chosen was added thereto, so that a layer of glass beads 12 soaked with trichlene represents a groundwater model polluted with trichlene.

Next, a piece of hydrophobic filter 13 (polyflon PF100, AdvanTec, 1 mm thick) cut into a strip of 20 mm (width)× 100 mm (length) was inserted into the beaker such that its one end was exposed to air (about 50 mm of the top end was exposed to air) and the other end was placed into the trichlene-polluted glass beads layer 12. The system was placed in a draft where sucking of air was underway, and left overnight.

On the other hand, a comparative example was prepared as follows: another beaker was prepared which was similarly treated except that a hydrophobic filter was not inserted, and the system was placed into the air-sucking draft together with the system in Example 1, and similarly left overnight there.

Next day, the beaker of Example with a hydrophobic filter placed therein was submitted to analysis; its trichlene concentration reduced by about 100 ppm. By contrast, the same beaker of Comparative Example with no filter inserted showed that its trichlene concentration reduced by only a few ppm. From those experimental results, it was suggested that insertion of a hydrophobic filter into the trichlene-deposited layer in a groundwater would be also effective for efficient removal of the trichlene deposited there.

EXAMPLE 2

An experiment will be described below which demonstrates the cleaning effect of the system of this invention when applied to a groundwater polluted with trichlene. A cleaning test was made using a 5 m deep well polluted with 10 ppm trichlene. A hydrophobic filter (Polyflon filter) similar to the one used in Example 1 was used. The test site consisted of a 10 m square where polyflon filters were inserted into the ground with 500 mm apart from one another. The width of each filter was chosen as 100 mm arbitrarily, and each filter had an air-exposed end of 300 mm long. Apart from them, a reference well was prepared at the center of the test site to follow the properties of the groundwater sequentially. The simplified arrangement of the testing elements was as represented in FIG. 1.

Figure 8:
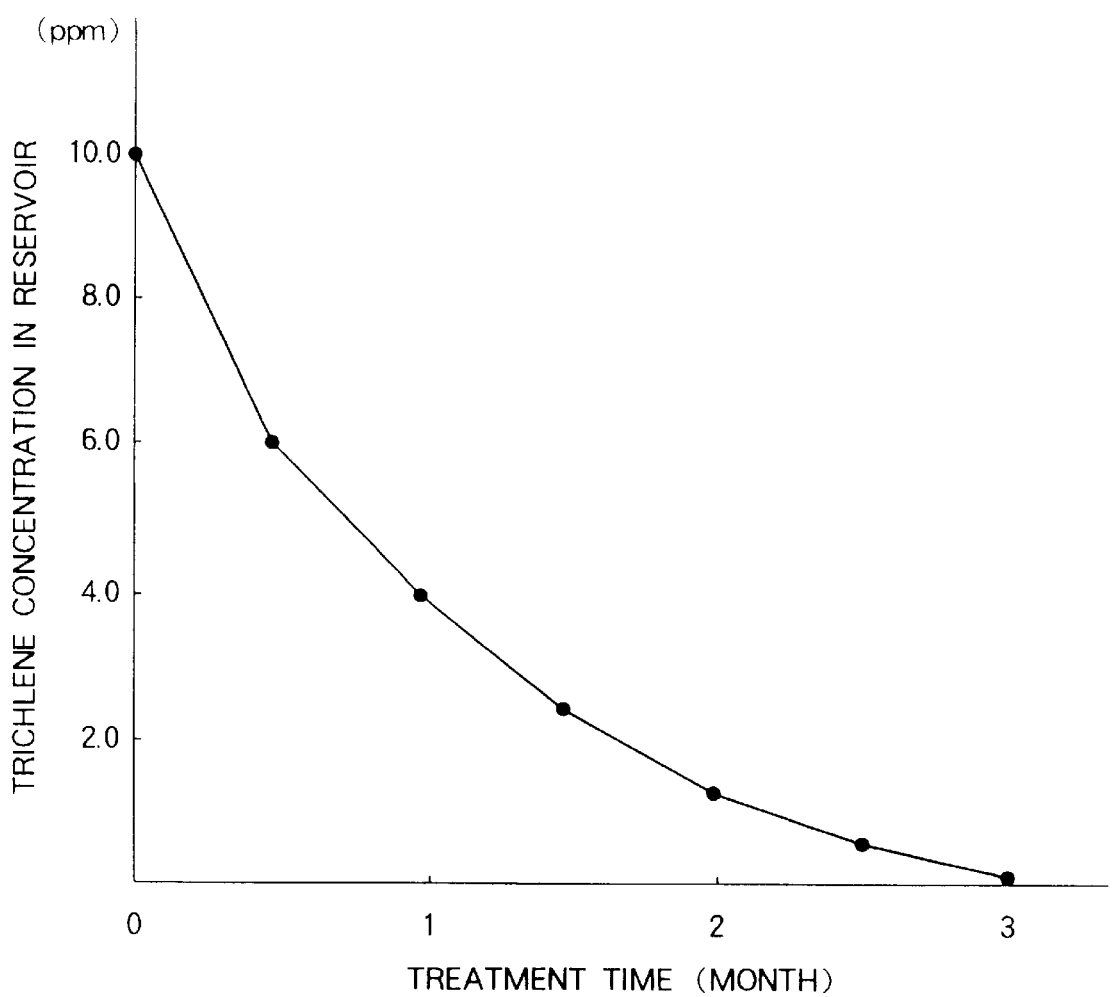
FIG. 8 plots the changes in trichlene concentration of groundwater with time observed in Example 2.

Following the method described above, the groundwater was put to the cleaning test, and the trichlene concentrations in the groundwater were followed at intervals. The results are shown in FIG. 8. As is obvious from FIG. 8, in a period of about 3 months, the trichlene concentration fell below 30 ppb (a criterion according to which it is determined whether or not the involved water agrees with the good environment). Application of physical means such as vacuum extraction or introduction of active carbon would bring about a reduction of down to 1 ppm in a relatively short period, but, for further reduction, it would require, so it has been said, continuous operation as long as 1 month or longer. From this test it was demonstrated that the system of this invention can eliminate trichlene in groundwater without needing any maintenance works or energy supply, though requiring a longer period to reduce trichlene to a sufficiently low level than do conventional techniques.

EXAMPLE 3

Next, description will be given of a practical test by which the method of this invention based on the combinational use of trichlene-decomposing bacteria was demonstrated to be effective for the treatment of a trichlene-polluted groundwater. A cleaning test was performed by applying porous absorbents to which trichlene-decomposing bacteria had been fixed to the same test site as in Example 2. The trichlene-decomposing bacteria consisted of KK01 strain of *Pseudomonas cepacia* (FERM, BP-4235). These bacteria had been grown on LB media containing 1 ppm trichlene for three days (298K), harvested, resuspended in an equivalent amount of MEM solution, and stored in a refrigerator. They were fixed onto a substrate made of polyurethane.

Fixation of those bacteria was conducted as follows. An appropriate amount of polyurethane prepolymer (HYPOLFHP2000, Merck) and the same amount of buffer were mixed and stirred vigorously for 1 minute. Then, to the mixture added was said bacterial suspension, and the mixture was stirred for 1 minute, to which the same bacterial suspension was added again, to be stirred for 1 minute then. After these processes, the trichlene-decomposing bacteria were applied onto the substrate made of polyurethane foam for fixation.

The substrate with the trichlene-decomposing bacteria fixed thereto was cut into square sheets of 5 mm thick and 100 mm long each, and each sheet was bonded with an epoxy adhesive onto the same hydrophobic filter (polyflon filter) as in Example 2. The sheet was bonded in such a manner that its length ran from the upper level of the groundwater to a height of about 50 mm above the ground. Such a long strip of filter was inserted into a polypropylene pipe having a 95 mm internal diameter, 10 mm thickness and 4.7 m length. A number of such filter-inserted pipes were inserted into the test site in the same manner as in Example 2. The polypropylene pipe had two grooves (25 mm in depth and 6.5 mm in width) inscribed to stabilize the filter sheet, and had holes for ventilation opened on its wall.

Figure 9:
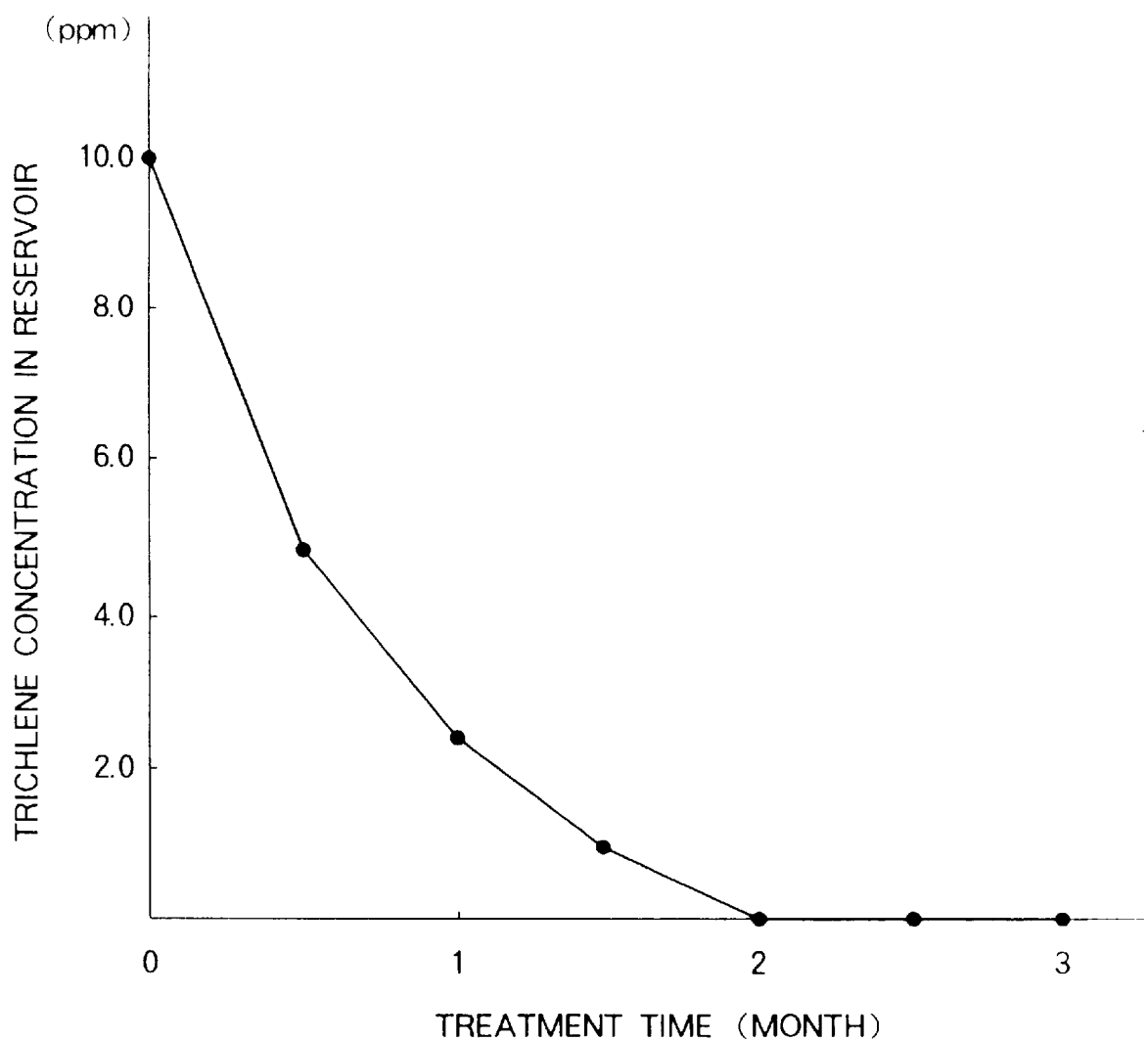
FIG. 9 plots the changes in atrichlene concentration of groundwater with time observed in Example 3.

Cleaning up the groundwater was carried out in the same manner as described above, and the concentrations of trichlene in the groundwater were followed at intervals. The results are shown in FIG. 9. As is obvious from the figure, the trichlene concentration fell below 30 ppb in about 2 months. Comparison of this result with that of Example 2 demonstrates that the method based on the combinational use of decomposing bacteria quickens elimination of pollutants by about one month.

EXAMPLE 4

Next, description will be given of a model experiment whereby cleaning up a water polluted with cadmium was tested. Conventional active sludge has been said to absorb heavy metals including cadmium quite well. Thus, we carried out the model experiment using active sludge, to test its cleaning activity towards a water polluted with cadmium.

Active sludge had been obtained from an ordinary sewage treating factory, removed it of inactive particles, and cultured overnight to be ready for use. The resulting mass was suspended in a 2.5% sodium alginate, and was allowed to pass through a slit of 5 mm thick and 20 mm wide and then to pass slowly through a 0.1M calcium chloride solution, to produce a cell suspension which was used as the bacteria to be fixed to a substrate. The bacteria were applied onto a hard-texture filter (No. 4A, AdvanTec) in the form of a strip (20 mm wide and 10 mm long) from the bottom to a level about 50 mm higher. The polluted water consisted of a borate buffer adjusted to pH=8 and containing 10 ppm cadmium chloride.

Figure 10:
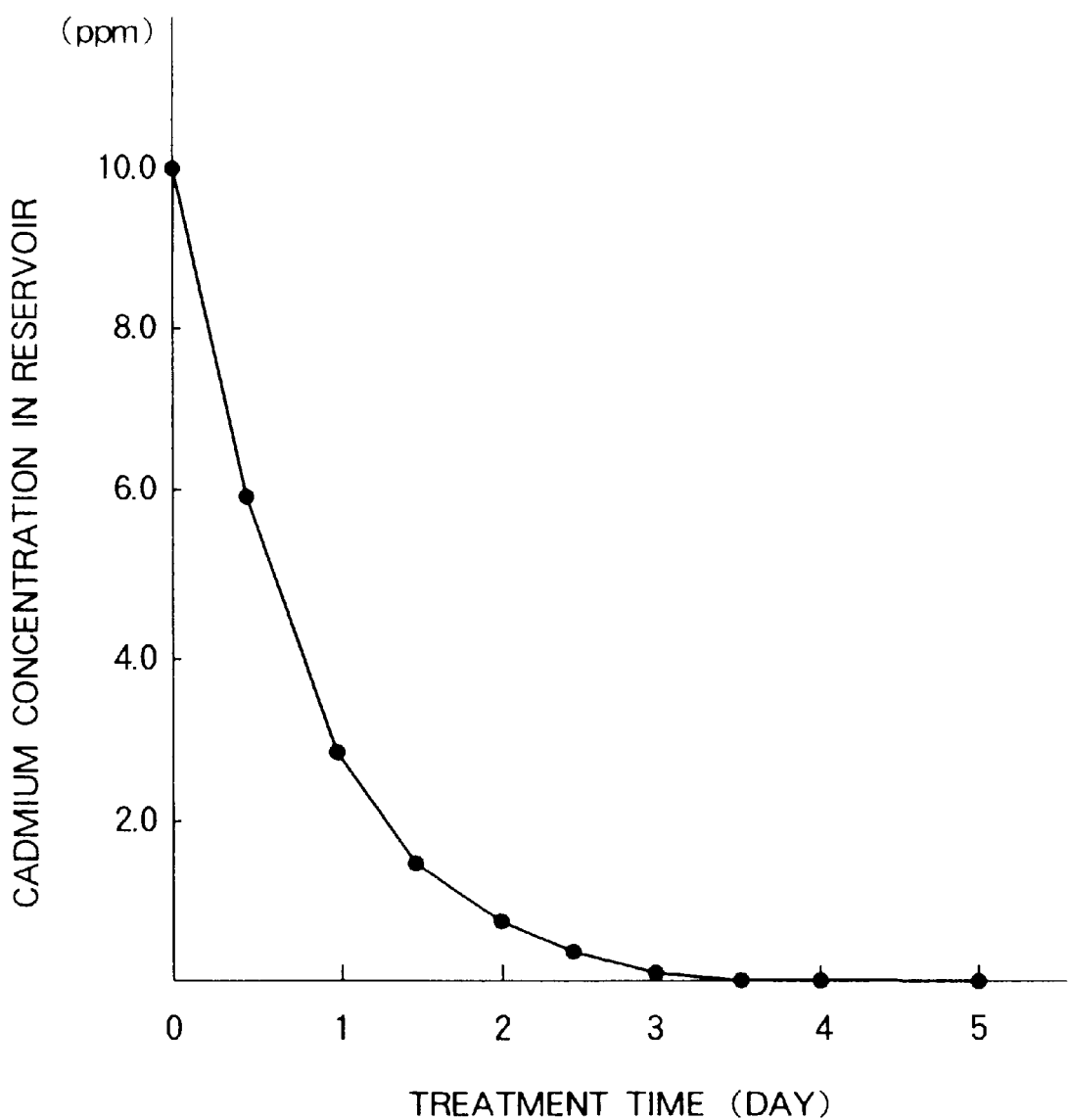
FIG. 10 plots the changes in cadmium concentration of polluted water with time observed in Example 4.

A 50 ml of said polluted water was placed in a beaker, into which was inserted said strip of filter upon which the bacteria had been fixed. The assembly was allowed to stay at room temperature, and the concentrations of cadmium were followed at regular intervals by atomic absorption spectrophotometry. The results are shown in FIG. 10. It was revealed that the cadmium in the polluted water was completely eliminated in the testing interval lasting about 3 days.

As is obvious from above description, the method of this invention allows efficient removal of pollutants without requiring energy and maintenance works therefor, and at a low cost and after simple processes. In addition, addition of microorganisms capable of decomposing/absorbing pollutants to the porous absorbent will further enhance the pollutant eliminating activity of the system. Besides, such system reduces stresses against the environment, and is biologically safer than the conventional open systems.

What is claimed is:

1. A method for eliminating volatile hydrophobic environmental pollutants from a polluted site containing said pollutants, which comprises the following steps:

inserting a porous absorbent into said polluted site so that one end of said porous absorbent is in contact with said pollutants, and the other end of said porous absorbent is exposed to the air; and eliminating said pollutants absorbed into said porous absorbent by spontaneously rising up said absorbed pollutants to said air-exposed end side of said porous absorbent under the vaporizing activity of said volatile hydrophobic pollutants.

2. A method for eliminating volatile hydrophobic environmental pollutants as described in claim 1, wherein said volatile hydrophobic pollutants are evaporated from said air-exposed end of said porous absorbent under the vaporizing activity of said volatile hydrophobic pollutants.

3. A method for eliminating volatile hydrophobic environmental pollutants as described in claim 1, wherein said volatile hydrophobic pollutants include at least one member selected from the group consisting of chlorinated organic solvents, petroleum, agrochemicals and PCB.

4. A method for eliminating volatile hydrophobic environmental pollutants as described in claim 1, wherein said porous absorbent has a multi-cellular structure containing a hydrophobic material, or has been treated so as to be provided with hydrophobic property.

5. A method for eliminating volatile hydrophobic environmental pollutants as described in claim 1, wherein said porous absorbent consists of a multi-cellular structure selected from the group consisting of a filter paper, a filter material and a sponge material.

6. A method for eliminating volatile hydrophobic environmental pollutants as described in claim 1, wherein said porous absorbent has a cylindrical multi-cellular structure.

7. A method for eliminating volatile hydrophobic environmental pollutants as described in claim 1, wherein a space forming cylinder is arranged around said porous absorbent inserted into said polluted site.

8. A method for eliminating volatile hydrophobic environmental pollutants as described in claim 1, wherein said polluted site is a soil or a groundwater containing said pollutants.

9. A method for eliminating volatile hydrophobic environmental pollutants as described in claim 1, wherein said porous absorbent has microorganisms capable of decomposing/absorbing said volatile hydrophobic pollutants fixed to at least a part thereof, and said volatile hydrophobic pollutants are decomposed or absorbed by said microorganisms while rising us to said air-exposed end side of said porous absorbent.

10. A method for eliminating volatile hydrophobic environmental pollutants as described in claim 9, wherein said porous absorbent is bonded to a substrate onto which said microorganisms have been fixed.

11. A method for eliminating volatile hydrophobic environmental pollutants as described in claim 10, wherein said substrate onto which said microorganisms have been fixed is sandwiched between two of said porous absorbents.

12. A method for eliminating volatile hydrophobic environmental pollutants as described in claim 9 wherein a space forming cylinder is arranged around said porous absorbent inserted into said polluted site.

13. A method for eliminating volatile hydrophobic environmental pollutants as described in claim 9, wherein said volatile hydrophobic pollutants include at least one member selected from the group consisting of chlorinated organic solvents, petroleum, agrochemicals and PCB.

14. A method for eliminating volatile hydrophobic environmental pollutants as described in claim 9, wherein said porous absorbent has a multi-cellular structure containing a hydrophobic material, or has been treated so as to be provided with hydrophobic property.

* * * * *

UNITED STATES PATENT AND TRADEMARK OFFICE
CERTIFICATE OF CORRECTION

PATENT NO.: 5,897,778

DATED: April 27, 1999

INVENTOR(S): Ishimori et al.

It is certified that an error appears in the above-identified patent and that said Letters Patent is hereby corrected as shown below:

Title page, Item [57], in the Abstract, line 9, delete "pollutant" and insert --pollutants--.

Signed and Sealed this

Fourteenth Day of December, 1999

Attest:

Q. TODD DICKINSON

*Attesting Officer*    *Acting Commissioner of Patents and Trademarks*